US005745592A

United States Patent [19]
Nalwa

[11] Patent Number: 5,745,592
[45] Date of Patent: Apr. 28, 1998

[54] METHOD FOR DETECTING FORGERY IN A TRACED SIGNATURE BY MEASURING AN AMOUNT OF JITTER

[75] Inventor: Vishvjit Singh Nalwa, Middletown, N.J.

[73] Assignee: Lucent Technologies Inc., Murray Hill, N.J.

[21] Appl. No.: 508,573

[22] Filed: Jul. 27, 1995

[51] Int. Cl.⁶ ........................................ G06K 9/00
[52] U.S. Cl. ................................ 382/119; 382/187
[58] Field of Search .................. 382/119–123, 116, 382/187, 215; 348/161

[56] References Cited

U.S. PATENT DOCUMENTS

| | | | |
|---|---|---|---|
| 5,251,265 | 10/1993 | Dohle et al. | 382/123 |
| 5,537,489 | 7/1996 | Sinden et al. | 382/187 |
| 5,559,895 | 9/1996 | Lee et al. | 382/119 |
| 5,559,897 | 9/1996 | Brown et al. | 382/119 |
| 5,623,555 | 4/1997 | Nelson et al. | 382/119 |

FOREIGN PATENT DOCUMENTS

| 0407307 | 1/1991 | European Pat. Off. | 382/119 |
|---|---|---|---|

OTHER PUBLICATIONS

Pavlidis, "Curve Fitting with Conic Splines", ACM Transactions on Graphics, vol. 2, No. 1, Jan. 1983, pp. 1–31.
Achemlal et al, "Dynamic Signature Verification", Security and Protection in Information Systems, Dec. 1986.

*Primary Examiner*—Leo Boudreau
*Assistant Examiner*—Bhavesh Mehta
*Attorney, Agent, or Firm*—Christopher N. Malvone

[57] ABSTRACT

Forgeries are detected by curve fitting the signature in question. The length of the curve fitted signature and the length of the signature in question are compared. If the signature in question is a traced or copied forgery, it will tend to have a significant amount of jitter which results in a significantly longer length than the curved fitted signature.

5 Claims, 1 Drawing Sheet

FIG. 1
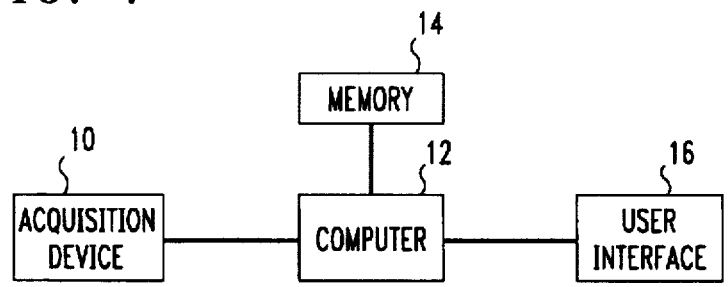
FIG. 2
FIG. 3
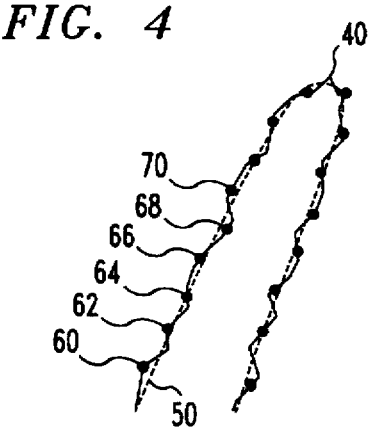
FIG. 4

METHOD FOR DETECTING FORGERY IN A TRACED SIGNATURE BY MEASURING AN AMOUNT OF JITTER

BACKGROUND OF THE INVENTION

1. Field of the Invention

The present invention relates to signature analysis; more particularly, a signature verification method.

2. Description of the Related Art

In the past, signatures were verified by comparing a signature in question with a collection of samples of a valid signature. After the signature was normalized to a particular scale, the overall shape of the signature was compared with the stored samples or templates. Unfortunately, this type of comparison was susceptible to forgeries made by tracing or copying a valid signature.

SUMMARY OF THE INVENTION

An embodiment of the present invention provides a method for detecting forged signatures that were made by methods such as tracing a valid signature. As a signature is traced, it typically includes jitter. Jitter results from the many small corrections a person makes in the process of tracing a signature. Forgeries are detected by curve fitting the signature in question. The length of the curve fitted signature and the length of the signature in question are compared. If the signature in question is a traced forgery, it will tend to have a significant amount of jitter which results in a significantly longer length than the curve fitted signature.

In another embodiment of the present invention, samples of valid signatures are collected, and the amount of jitter in each valid signature is measured. Then when a signature in question is checked for authenticity, the amount of jitter can be compared with the amount of jitter included in valid signatures. This helps to prevent the rejection of valid signatures produced by people with jittery signatures.

BRIEF DESCRIPTION OF THE DRAWING

FIG. 1 is a block diagram of a system for verifying signatures;

FIG. 2 illustrates a signature to be analyzed;

FIG. 3 illustrates a segment of the signature of FIG. 2; and

FIG. 4 illustrates the signature segment of FIG. 3 after curve fitting.

DETAILED DESCRIPTION OF THE INVENTION

FIG. 1 illustrates a block diagram of a signature verification system. Signature acquisition device 10 provides an electronic representation of an acquired signature to computer 12. Acquisition device 10 may be a device such as a scanner or an electronic writing tablet. Computer 12 compares the electronic representation of the signature in question with templates produced from samples of valid signatures stored in memory 14. The results of the comparison and any instructions to or from a user are communicated by user interface 16. User interface 16 may include common devices such as a mouse, keyboard or touch screen display. In addition to comparing an electronic representation of a signature in question with templates stored in memory 14, computer 12 also performs a jitter measurement on the signature in question for forgery detection. This jitter measurement helps determine whether a forgery is being attempted using a tracing method.

FIG. 2 illustrates a sample of a signature to be analyzed. Square 30 identifies a segment of the signature that will be discussed for illustrative purposes; however, the curve fittings and jitter measurements of the present invention may be carried out on the entire signature. FIG. 3 illustrates the segment of the signature contained within square 30. It should be noted that signature segment 40 is not a smooth curve and comprises variations away from smoothly drawn curves.

FIG. 4 illustrates signature segment 40 and curve 50 fitted to signature segment 40. Curve 50 is fitted to signature segment 40 using standard techniques such as least squares error fitting with B-splines or polygons. Such a technique is discussed "Curve fitting with conic splines", by T. Pavlidis, ACM Trans. Graphics 2, No. 1, 1983, 1–31., New York, N.Y. The signature to be analyzed is composed of samples 60, 62 and 64. The actual length of the signature in question is determined by measuring the distance between each sample and forming a sum of those distances. For example, the distance between samples 64 and 66 is added to the distance between samples 66 and 68 which is added to the distance between samples 68 and 70. This process is continued through the entire signature. This total actual length is then compared to the total length of fitted curve(s) 50. These two lengths may be compared by forming a ratio as illustrated in equation 1.

$$\text{Jitter} = 1 - \frac{l_f}{\Sigma l_p} \qquad \text{EQ. 1}$$

NOTE: $0 \leq \text{Jitter} \leq 1$

In equation 1 the jitter is equal to 1 minus the total length of the fitted curve(s) divided by the sum of the lengths or distances between consecutive samples, where $l_f$ is the overall length of the fitted curve(s) 50, $l_p$ is the length between consecutive samples such as samples 68 and 70, and the sum of such lengths is represented by the term $\Sigma l_p$. It should be noted that the jitter will be greater than or equal to 0 but less then or equal to 1.

A forgery performed by tracing or copying a valid signature will tend to have a large amount of jitter. Jitter results from the forger making minute corrections for deviation from the original signature while the trace or copy is being made. As a result, a forgery performed using tracing or copying tends to have a larger amount of variation or jitter than a valid signature performed using long smooth motions. When the jitter described by equation 1 approaches 0, the signature in question is very smooth and is most likely not a forgery based on a tracing. On the other hand, if the jitter approaches 1, the signature in question comprises a large number of corrections or jitter, which is indicative of a forgery through tracing.

If no samples of an original signature are available, a measure of jitter can be used to determine whether there is a high probability of a forgery through tracing. A threshold such as 0.5 may be used to alert a user to the possibility of a forgery so that that the user may request a second signature to be executed in the user's presence. If samples of valid signatures are available, the sample signatures may be used to determine whether a certain amount of jitter is typically in a valid signature. Jitter measurements, as described above, are performed on valid signatures so that a jitter value is determined with each sample of a valid signature. If only a single valid signature is available, a single jitter value is used to set a threshold for determining authenticity or validity. The threshold may be set in accordance with equation 2, where j is the jitter measurement of the valid signature and T is the threshold.

$$T=0.5(j+1) \quad \text{EQ.2}$$

If a large collection of valid signatures are available, a range of acceptable jitter values for valid signatures may be stored in memory. When a signature is examined for authenticity, the jitter measurement of the signature in question is compared to the threshold or jitter measurements associated with valid signatures. If the jitter measurement of the signature under examination exceeds the threshold or lies significantly outside the range of valid signature jitter values, a forgery is declared. An upper and lower threshold may be set to determine if a measurement lies significantly outside the range. The upper threshold may be determined in accordance with equation 2 where j is the largest jitter measurement of the valid signatures. The lower threshold may be set in accordance with equation 3 where j is the smallest jitter measurement of the valid signature.

$$T=0.5j \quad \text{EQ.3}$$

Measuring the jitter in valid sample signatures is particularly useful with regard to signatures obtained from elderly people. Many elderly people have a less steady hand and produce signatures with large amounts of jitter. As a result, false alarms or false indications of a forgery can be reduced by comparing the jitter measurement from the signature in question with a range of acceptable jitter values obtained from valid signatures.

The invention claimed is:

1. A method for detecting forgery in a traced signature by measuring an amount of jitter in the traced signature, comprising the steps of:

taking a plurality of samples of the traced signature;

forming a sum of distances between consecutive samples belonging to the plurality of samples;

fitting a curve to the traced signature;

measuring a length of the curve; and detecting forgery in the traced signature by comparing the sum of distances to the length of the curve.

2. The method of claim 1, wherein the step of detecting forgery in the traced signature comprises forming a ratio using the sum of distances and the length of the curve.

3. The method of claim 2, wherein the step of detecting forgery in the traced signature comprises comparing the ratio to a threshold.

4. A method for detecting forgery in a traced signature by measuring an amount of jitter in the traced signature, comprising the steps of:

collecting at least one valid signature;

taking a first plurality of samples of the valid signature;

forming a first sum of distances between consecutive samples belonging to the first plurality of samples;

fitting a first curve to the valid signature;

measuring a first length of the first curve;

determining a threshold by forming a first ratio using the first sum of distances and the first length of the first curve;

taking a second plurality of samples of the traced signature;

forming a second sum of distances between consecutive samples belonging to the second plurality of samples;

fitting a second curve to the traced signature;

measuring a second length of the second curve;

forming a second ratio using the second sum of distances and the second length of the second curve; and detecting forgery in the traced signature by comparing the second ratio and the threshold.

5. A method for detecting forgery in a traced signature by measuring an amount of jitter in the traced signature, comprising the steps of:

collecting a first valid signature;

taking a first plurality of samples of the first valid signature;

forming a first sum of distances between consecutive samples belonging to the first plurality of samples;

fitting a first curve to the first valid signature;

measuring a first length of the first curve;

determining a first ratio using the first sum of distances and the first length of the first curve;

collecting a second valid signature;

taking a second plurality of samples of the second valid signature;

forming a second sum of distances between samples belonging to the second plurality of samples;

fitting a second curve to the second valid signature;

measuring a second length of the second curve;

determining a second ratio using the second sum of distances and the second length of the second curve;

determining a range of acceptability using the first and second ratios;

taking a third plurality of samples of the traced signature;

forming a third sum of distances between samples belonging to the third plurality of samples;

fitting a third curve to the traced signature;

measuring a third length of the third curve;

forming a third ratio using the third sum of distances and the third length of the third curve; and detecting forgery in the traced signature by comparing the third ratio and the range of acceptability.

* * * * *